P. D. CHRISTMAN.
DETACHABLE STRAP TIGHTENER.
APPLICATION FILED JAN. 15, 1910.
978,357.
Patented Dec. 13, 1910.
2 SHEETS—SHEET 1.
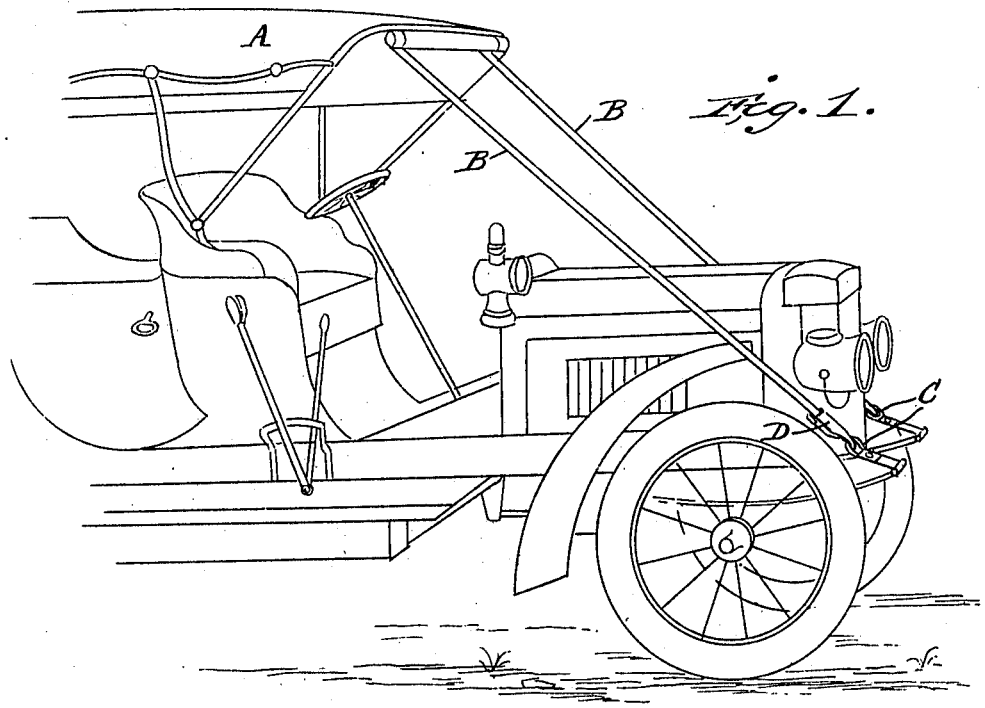
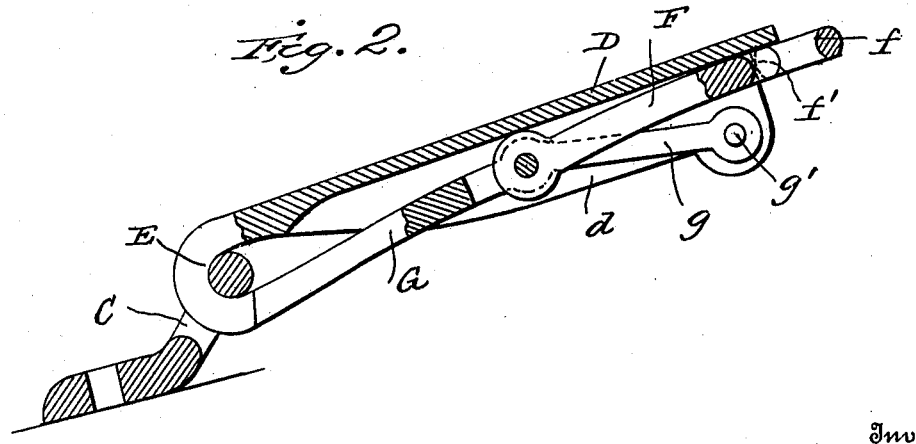

P. D. CHRISTMAN.
DETACHABLE STRAP TIGHTENER.
APPLICATION FILED JAN. 15, 1910.
978,357.
Patented Dec. 13, 1910.
2 SHEETS—SHEET 2.
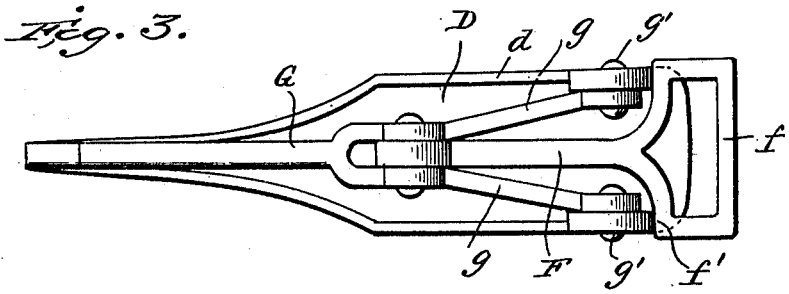
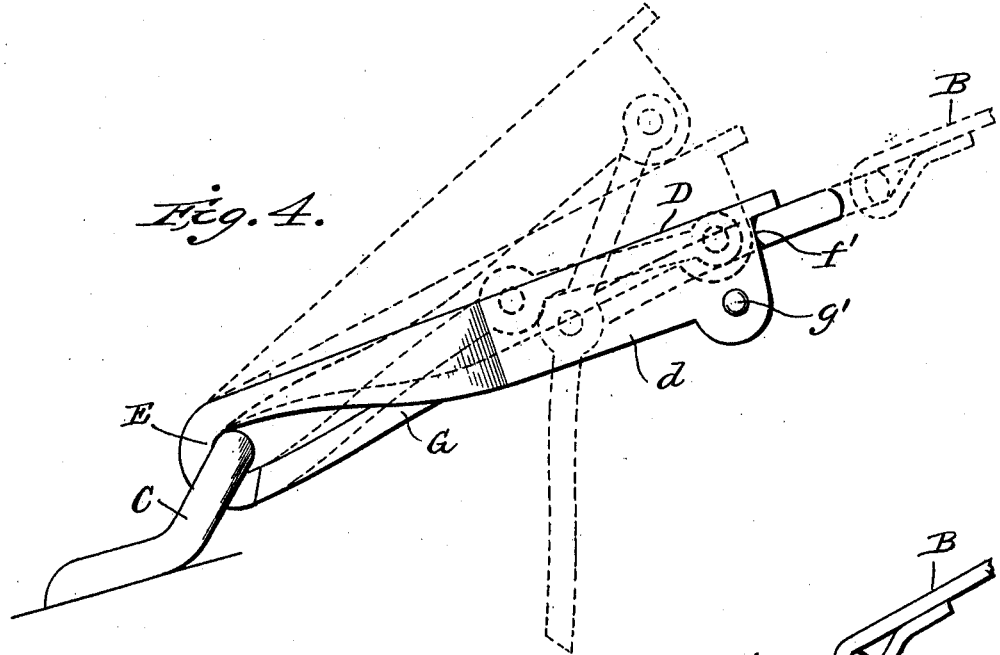
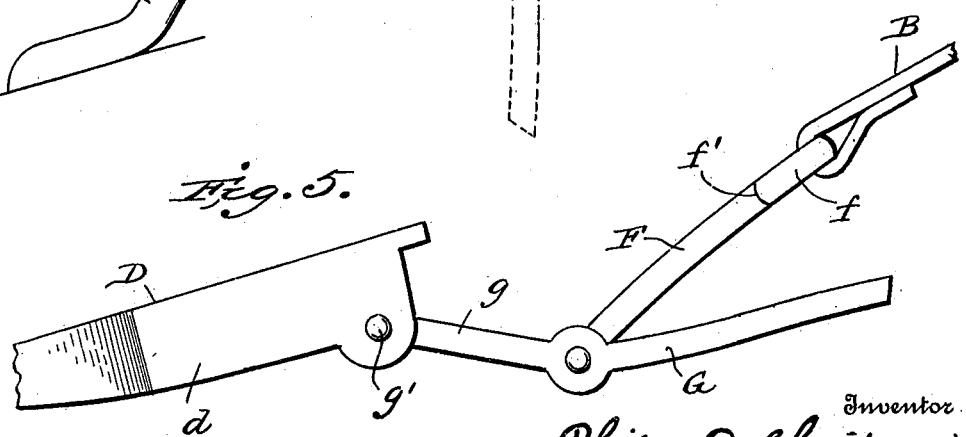
Witnesses
Thomas Durant
Halbert P. Simon
Inventor
Philip D. Christman
By Church & Church
his Attorney

UNITED STATES PATENT OFFICE.

PHILIP D. CHRISTMAN, OF BRYAN, OHIO.

DETACHABLE STRAP-TIGHTENER.

978,357.　　　　Specification of Letters Patent.　　Patented Dec. 13, 1910.

Application filed January 15, 1910. Serial No. 538,249.

*To all whom it may concern:*

Be it known that I, PHILIP D. CHRISTMAN, a citizen of the United States, residing at Bryan, in the county of Williams and State of Ohio, have invented certain new and useful Improvements in Detachable Strap-Tighteners; and I do hereby declare the following to be a full, clear, and exact description of the same, reference being had to the accompanying drawings, forming a part of this specification, and to the figures and letters of reference marked thereon.

The primary object of this invention is to provide a device for detachably securing and tightening the straps for straining and holding automobile and speed launch tops, although I do not wish to be understood as restricting the invention to the particular uses mentioned.

The invention embodies a loop or engaging member for the strap, a hook to form the detachable connection, link and lever members intermediate the loop and hook and a housing for the link and lever members, said parts being so assembled and connected that the loop and hook may be drawn toward each other in turning the parts into locked position and when in locked position the parts will be held by the tension of the strap, the hook being closed by one of the members and held against accidental opening by the coöperation of the other members.

In the accompanying drawings—Figure 1 is a perspective view showing in outline the front portion of an automobile with its top and straps for holding the top under tension, with the present invention applied thereto; Fig. 2 is a sectional view through the detachable holding and tightening device; Fig. 3 is a bottom plan; Fig. 4 is a side elevation with the parts shown in full lines in normal or closed position and in dotted lines in positions they assume when being opened for relieving the tension and detaching the connector; and Fig. 5 is a side elevation showing the parts open and ready to be swung into closed position to put the strap and cover under tension.

Similar letters of reference in the several figures denote the same parts.

The conventional illustration of the automobile in Fig. 1 shows the folding top A held taut by the usual straps B which extend diagonally down and forwardly to fastenings on some part of the framing, such, for instance, as the eyes or rings C.

In accordance with the present invention provision is made for detachably connecting the straps with the eyes or rings, the attaching device embodying means for drawing the straps and top taut and locking the device against accidental release when subjected to shock or rough usage.

The connecting device embodies a top frame or housing D having at one end a hook E preferably curved toward the open side of the housing to coöperate with a hook closing member adapted to lie within the housing and be substantially concealed from view by the side walls $d$. The strap B is passed through or connected with an eye or loop $f$ or its equivalent on the upper end of a link member F while the lower end of said link member is pivotally connected with an intermediate part of a lever member G. The lever member is pivotally connected with the housing at the upper end and is adapted to coöperate at its free end with the end of the hook to close the same as shown in Figs. 2 and 4. As a convenient and preferable construction, although variations will at once suggest themselves, the upper end of the lever member G is bifurcated, as shown in Fig. 3, and the two arms $g$ are pivotally connected at $g'$ with the side walls of the housing. The link member is pivoted between the arms $g$ and is of such dimensions that shoulders $f'$ thereon will pass in over the upper ends of the side walls when the lever member is in closed position, as shown in Fig. 2. In the position shown in said Fig. 2 the link has crossed the axis of the lever and lies in a plane on the inner side of the pivots $g'$ whereby any strain or tension tends to hold the members in their closed or locking position. Should pressure be brought on the hook closing end of the lever member tending to open the same the shoulders $f'$ on the loop by engaging the shoulders formed by the end walls of the housing effectually hold the parts closed and, hence in order to open the device the housing should be grasped and lifted to the positions shown in dotted lines, Fig. 4, thereby first withdrawing the side walls of the housing from beneath the shoulders on the loop and moving the link member across the pivotal center of the lever after which the parts will at once open to the position shown in Fig. 5 and the hook may be detached.

With the parts shown in Fig. 5 and the hook in engagement with its eye the lever may be grasped and the parts brought to the positions shown in Fig. 4. The leverage is sufficient to enable the top of the vehicle to be drawn forward, even against considerable resistance and the take-up is sufficient, (i. e., approximately the length of the link member and inner end of the lever) to draw the top and strap taut even though they are very loose when the hook is first engaged with its eye.

The housing for the working parts forms a complete cover which is easily kept polished and clean and when in use presents the appearance of a simple hook to which the strap is connected. The weight of the housing being mainly supported by the link member and strap, assists in keeping the parts in closed or locked position and, in addition, the shoulders of the link members will bind against the end of the housing should the lower end of the lever tend to drop, thus holding the parts in locking position, even though the strap is slack.

Having thus described my invention, what I claim as new and desire to secure by Letters Patent of the United States, is—

1. A detachable take-up connector of the character set forth embodying a housing having a hook at one end and longitudinal side walls, extending to the opposite end, a lever member pivotally mounted in the housing between the side walls on an axis fixed with relation to the housing and lever and at its free end coöperating with the hook to close the same, and a link member pivotally connected with an intermediate part of the lever member to move across the axis of the latter in closing, said link member having shoulders in proximity to its free end for coöperation with the housing in the closed position of the link member to hold the lever member closed.

2. A detachable take-up connector of the character set forth, embodying a housing having a hook at one end and side walls at the opposite end, a lever member pivotally mounted at one end between the side walls and coöperating at the opposite end with the hook to close the same, a link member having a loop at one end forming shoulders adapted to coöperate with the side walls of the housing and at the opposite end pivotally connected with an intermediate part of the lever to move between the side walls and across the axis of the lever in closing, said link resting against and serving to support the housing when in closed position.

3. A detachable take-up connector of the character set forth, embodying a housing having a hook at one end, a lever pivotally mounted at one end in the housing and at its free end coöperating with the hook to close the same, a link member pivotally connected with the lever to move across the axis of the latter in closing, means on the link for the connection of a coöperating strap and shoulders on the end of the housing and shoulders on the free end of the link, coöperating with the shoulders on the housing when the link is moved beyond the axis of the lever to hold the lever in closed position.

PHILIP D. CHRISTMAN.

Witnesses:
  Audrey Wright,
  John B. White.